Figure 1:
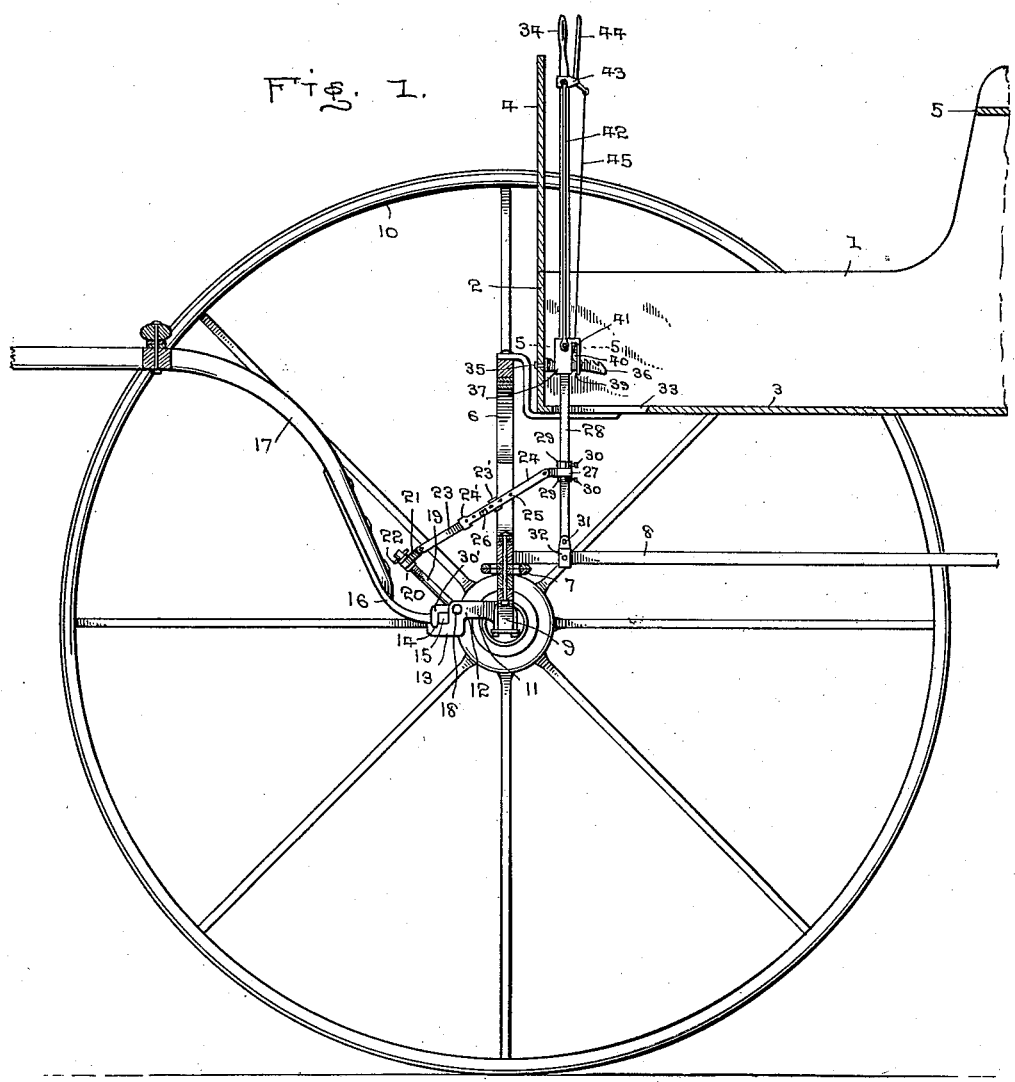

H. H. McCORMICK.
SAFETY ATTACHMENT FOR VEHICLES.
APPLICATION FILED APR. 7, 1914.

1,142,449.

Patented June 8, 1915.
2 SHEETS—SHEET 1.

Witnesses

Inventor
H. H. McCormick
By W. J. Fitzgerald & Co.
Attorneys

H. H. McCORMICK.
SAFETY ATTACHMENT FOR VEHICLES.
APPLICATION FILED APR. 7, 1914.
1,142,449.
Patented June 8, 1915.
2 SHEETS—SHEET 2.
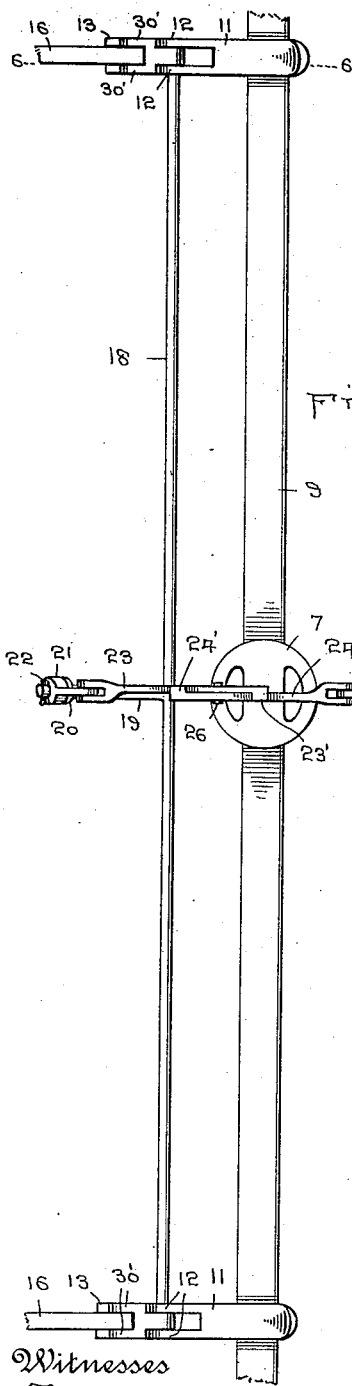
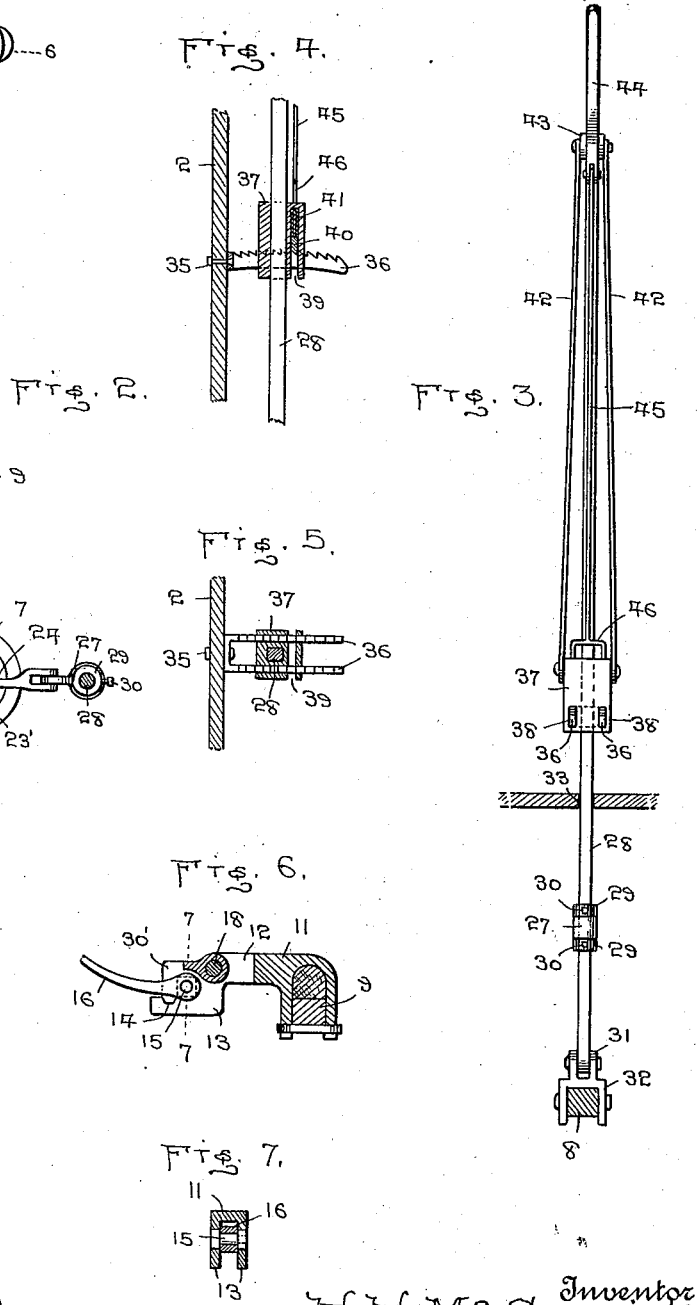
Witnesses
Thos. Riley
J. H. Reid.
Inventor
H. H. McCormick
By W. J. Fitzgerald & Co.
Attorneys

UNITED STATES PATENT OFFICE.

HARRY H. McCORMICK, OF GRAYROCKS, WYOMING.

SAFETY ATTACHMENT FOR VEHICLES.

1,142,449.  Specification of Letters Patent.  Patented June 8, 1915.

Application filed April 7, 1914. Serial No. 830,212.

*To all whom it may concern:*

Be it known that I, HARRY H. McCORMICK, a citizen of the United States, residing at Grayrocks, in the county of Platte and State of Wyoming, have invented certain new and useful Improvements in Safety Attachments for Vehicles; and I do hereby declare the following to be a full, clear, and exact description of the invention, such as will enable others skilled in the art to which it appertains to make and use the same.

This invention relates to a safety attachment for vehicles and is particularly adapted for use in connection with vehicles drawn by horse power, and has for one of its objects the construction of a device which may be readily applied to any vehicle of various dimensions and without the necessity of making any material alterations for applying the device to the vehicles.

A further object of this invention resides in the construction of a safety device for vehicles wherein the tongue or shafts may be readily detached from the vehicle in case of runaways thus releasing the horses therefrom and avoiding dangerous consequences attending accidents of this character.

A still further object of this invention resides in the provision of means for adjusting the device for fitting the same to any construction of vehicle. And a still further object of this invention resides in the means of mounting the operating lever whereby the same is unaffected by the vibrations of the vehicle and especially those having the bodies thereof mounted upon springs. And another object of the invention resides in the mounting of the operating lever within the body of the vehicle in proximity to the seat wherein the lever is in easy reach of and may be readily grasped by the driver of the vehicle. And still another object resides in the provision of a safety attachment for vehicles consisting of few parts, simple in structure, efficient and durable in purpose and which may be manufactured at a nominal cost.

These and other objects will more fully appear and the nature of the invention more clearly understood by the construction, combination and arrangements of the parts thereof, as described in the following specification, defined in the appended claims and illustrated in the accompanying drawings, in which, Figure 1 is a vertical longitudinal sectional view through the forward portion of a vehicle showing the attachment as applied to a vehicle in complete form ready for use. Fig. 2 is a top view, partly broken away, of the front axle of a vehicle showing the lower portion of my device as the same is arranged upon the running gear of the vehicle and within the thill couplings upon the axle. Fig. 3 is a rear view of the operating lever and the associated parts constituting a portion of the invention, the bottom of the vehicle body and the reach rod being shown in section. Fig. 4 is a vertical sectional view through the dash board and the ratchet mechanism showing the manner of mounting the operating lever therein for retaining the lever in its normal operative position. Fig. 5 is a sectional view on line 5—5 of Fig. 1 showing the arrangement of the rack bar and the ratchet mechanism. Fig. 6 is a horizontal sectional view through the thill couplings on line 6—6 of Fig. 2, showing the manner of securing the attaching irons of the tongue or shafts within the thill couplings. Fig. 7 is a vertical sectional view on line 7—7 of Fig. 6 showing the position of the detaching bolt within the thill couplings.

Referring to the drawings 1 denotes one of the sides of the body of a vehicle, 2 the front end thereof, 3 the bottom and 4 the dash board. The body is mounted upon the usual forward spring 6 under which is the usual fifth wheel 7, the reach rod 8, the front axle 9 upon which is mounted the front wheel 10, only one of the wheels being here shown.

Adjacent each of the ends of the axle 9 are the thill couplings 11 provided with the ears 12 and the bifurcated L-shaped members 13 in the upper portions of which, adjacent the ends, are provided the notches 14. Upon the horizontal portions of the bifurcated members 13 rests the attaching bolt 15 of the connecting irons 16 of the tongue or shafts 17.

Extending from the thill couplings 11 in front of and parallel with the front axle 9 and revolubly mounted within the ears 12 of the thill couplings 11 is the shaft 18 having fixedly connected thereto at a point intermediate of its ends, the upwardly and forwardly extending rocking arm 19 provided with the collar 20 upon which rests the sleeve 21 retained thereon through the means of the cotter pin or other securing means 22, and pivotally connected to the sleeve 21 is the link 23 provided with the guides 23' for engaging the body of the link 24 also provided with the guides 24' for engaging the body of the link 23, each of the links 23 and 24 being provided with a series of registering apertures through which passes the bolt 26 for securing the links 23 and 24 together. The apertures 25 are provided for either shortening or lengthening the distance between the opposing ends of the links for adjusting the same to meet the demands of vehicles of different sizes. The rear end of the link 24 is pivotally connected to the sleeve 27 rotatably mounted upon the operating lever 28 at a point slightly remote from the lower end of the lever 28 and retained thereon between the upper and lower collars 29, the collars 29 being secured to the operating lever 28 by the set screws 30.

Rigidly secured upon the shaft 18 within the ears 12 of the thill couplings 11 are the bifurcated L-shaped gripping fingers 30' for engaging the square head and nut respectively of the securing bolt 15 of the tongue or shaft 17, the ends of the gripping fingers being seated within the notches 14 of the L-shaped members 13 on the thill couplings 11 for securing the tongue or shaft 17 to the vehicle.

The lower end of the operating lever 28 is pivotally mounted in the ears 31 of the bracket 32 secured in any suitable manner upon the reach rod 8 in proximity to the front axle 9, the lever 28 projects upwardly through the elongated slot 33 formed in the bottom 3 of the vehicle adjacent the dash board 4, the lever 28 extending above the dash board 4 and having the operating handle 34 arranged at the upper end thereof.

Secured upon the inner side of the front 2 of the vehicle body a short distance from the bottom 3 thereof, by the bolt 35, are the parallel rack bars 36, the rack bars 36 being positioned upon the front 2 at a point centrally of the sides 1 of the vehicle and project in a rearwardly direction from the front 2 of the vehicle body. The lever 28 passes upwardly between the rack bars 36 and through the block 37, the block 37 being provided with the horizontal and parallel openings 38 through which the rack bars 36 pass, the block 37 being also provided with the vertical slot 39 adjacent the rear edge thereof and in which is slidably mounted the elongated pawl 40 for embracing and engaging the teeth of the rack bars 36 and normally held in engagement therewith by the spring 41 between the pawl 40 and the upper wall of the slot 39. Secured upon each of the sides of the block 37 and at each side of the operating lever 28 and extending upwardly and terminating at a point adjacent the handle 34 are the supporting rods 42 upon the upper ends of which is secured the sleeve 43. The sleeve 43 is supported by the rods 42 upon the block 37, the sleeve 43 and the block 37 being maintained in unaltered spaced relation by the supporting rods 42, the lever 28 passing loosely through the block 37 and the sleeve 43 and capable of vertical movement therethrough to provide for the vibrations and the variations between the vehicle body and the running gear thereof. Pivotally mounted within the sleeve 43 is the thumb piece 44 connected by the rod 45 to the yoke 46 connected to the pawl 40 for releasing the pawl 40 from its engagement with the rack bars 36 when necessary.

From the foregoing description of the construction and arrangements of the parts constituting this invention, it is obvious that should the horse or other animals attached to the vehicle become frightened and endeavor to run away, and the driver finding that he is unable to control the horses, it is only necessary for him to grasp the handle 34 of the operating lever 28, disengage the pawl 40 from the rack bars 36 by the thumb latch 44 and rapidly pull the lever inwardly and this movement through the link connections 23 and 24 of the lever 28 with the rocking lever 19 of the shaft 18 will thereby rock the latter thus throwing the gripping fingers 30' upwardly, releasing the same from engagement with the attaching bolt 15 arranged in the connecting iron 16 of the tongue or shaft 17 and at which stage the tongue or shaft 17 may be readily withdrawn from the thill couplings 11 upon the front axle 9 thus detaching the horses from the vehicle and thereby save the lives of and injury to the occupants of the vehicle.

While I have here shown the preferred embodiment of my invention, I hereby reserve the right to make such alterations and variations therein from time to time as I may deem expedient and which will neither depart from the spirit of this invention nor conflict with the scope of the claims.

Having thus fully described my invention, what I claim as new and desire to secure by Letters-Patent of the United States is:

1. In a device of the character described, the combination with the body, front axle, reach rod and draft appliance of a vehicle, of thill couplings upon said axle, draft releasing means having a rocking arm centrally projecting therefrom mounted in said thill couplings adapted to release said draft appliance, an operating lever pivotally mounted upon said reach rod, a plurality of pivotally mounted link members adjustably connecting said rocking arm to said operating lever to actuate the same through the medium of said operating lever and means mounted in said body adapted to support said operating lever and to allow compensation for the vibration of said operating lever received from said reach rod.

2. In a device of the character described, the combination with a vehicle having a body, a reach rod, a front axle with thill couplings secured thereto, and draft appliances, of draft appliance releasing means mounted in said thill couplings adapted to release said draft appliances, an operating lever pivotally mounted upon said reach rod, pivotally mounted link members adjustably connecting said operating lever to said draft appliance releasing means adapted to be operated thereby, a rack-bar having a plurality of rack members connected to said body, said operating lever operating between said rack members, means slidingly mounted upon said rack members adapted to vertically support said operating lever in such manner as to allow for compensation of vibration received from said reach rod, locking means slidingly mounted in said supporting means adapted to lock said supporting means upon said rack bar, and devices mounted upon said operating lever and connected to said locking means to actuate said locking means.

In testimony whereof I have signed my name to this specification in the presence of two subscribing witnesses.

HARRY H. McCORMICK.

Witnesses:
 A. C. FONDA,
 C. F. HAZLEWOOD.

Copies of this patent may be obtained for five cents each, by addressing the "Commissioner of Patents, Washington, D. C."